(No Model.)
T. B. MADDUX.
PULVERIZING ATTACHMENT FOR PLOWS.
No. 247,079. Patented Sept. 13, 1881.
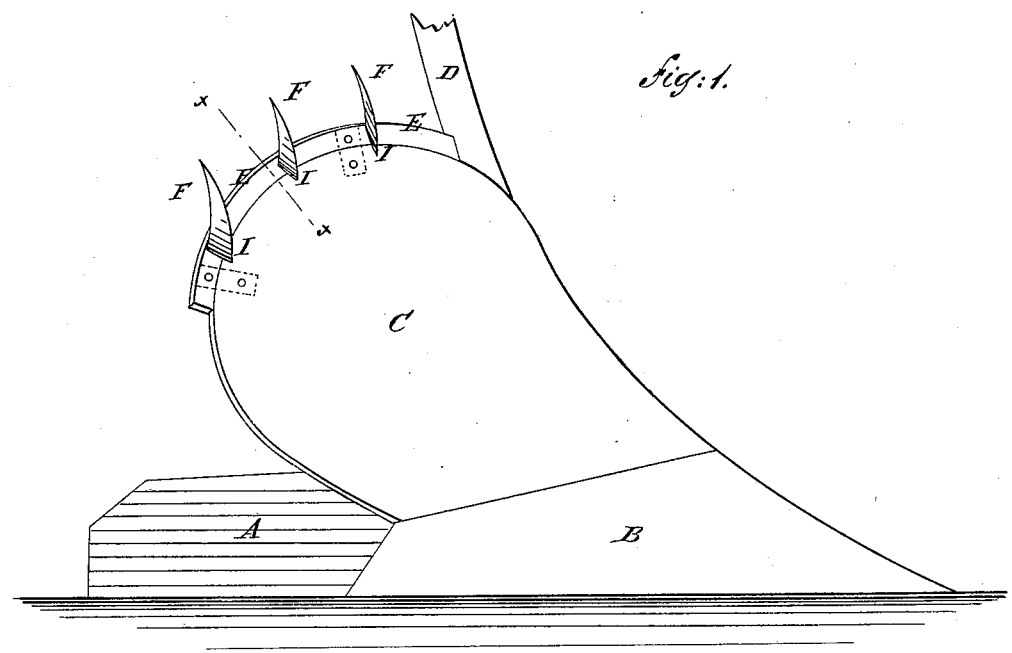
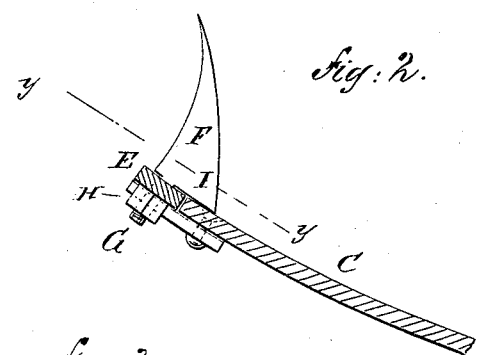
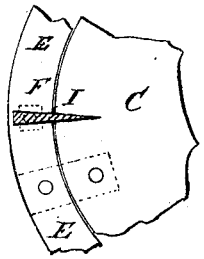
WITNESSES:
Chas. Nida
C. Sedgwick
INVENTOR:
T. B. Maddux
BY Munn & Co
ATTORNEYS.

United States Patent Office.

TAPLEY B. MADDUX, OF DENTON, TEXAS.

PULVERIZING ATTACHMENT FOR PLOWS.

SPECIFICATION forming part of Letters Patent No. 247,079, dated September 13, 1881.

Application filed June 9, 1881. (No model.)

*To all whom it may concern:*

Be it known that I, TAPLEY B. MADDUX, of Denton, in the county of Denton and State of Texas, have invented certain useful Improvements in Pulverizing Attachments for Plows, of which the following is a specification.

Figure 1 shows my improvement applied to a plow. Fig. 2 is a sectional elevation taken through the line $x\,x$, Fig. 1. Fig. 3 is a plan view of a part of the improvement, the cutter being shown in section through the line $y\,y$, Fig. 2.

Similar letters of reference indicate corresponding parts.

The object of this invention is to pulverize furrow-slices as they are turned by plows; and it is particularly designed to lessen the draft in such devices by arranging the cutters at the top of the mold-board in such manner as to offer but little resistance to the passage of the furrow-slice, as hereinafter described and claimed.

A represents the landside, B the shear, C the mold-board, and D the standard, of an ordinary turn-plow.

E is a bar or narrow plate of iron or other suitable material. The bar E is curved to correspond with the curvature of the rear end of the mold-board C, to which it is to be attached. The bar E is bolted to the rear edge of the mold-board C, or is secured to the said mold-board by lugs or straps and bolts, or in any other suitable manner.

F are cutters, which project upward and are inclined or curved to the rearward, and which are designed to be made with sharp forward edges. The cutters F are made with tangs G to pass through holes in the bar E, and have screw-threads cut upon the ends of the said tangs to receive the nuts H, by which the said cutters are secured in place. The cutters F have shoulders I at the forward sides of the tangs G, to rest upon the upper side of the mold-board C and strengthen the connection of the bar E and cutters F with the mold-board C. The length of the cutters F should be sufficient to reach through the furrow-slice, and more or fewer cutters can be used according as the soil is required to be pulverized more or less finely. In the case of sod land the cutters F cut the sod into narrow strips before it falls into the furrow.

With this construction the soil will be pulverized as it is turned by the plow and brought into as good condition as if harrowed, and at the same time the attachment will add very little to the draft of the plow.

As heretofore constructed slice-cutters have been attached to a mold-board at a point below the top thereof and with the cutters so inclined as to offer considerable resistance to the slice; but it will be seen that in my invention the cutters extend upward and backward and are secured to the top of the mold-board, where they offer the least possible resistance.

Having thus described my invention, I claim as new and desire to secure by Letters Patent—

The combination of the curved mold-board C, the bar E, which is secured to the upper curved edge thereof, and the upward-projecting and rearward-inclined cutters F, secured at desired angles in said bar, and provided with shoulders I, which rest upon the mold-board, substantially as shown and described.

TAPLEY B. MADDUX.

Witnesses:
W. C. SMARTT,
N. C. HEROD.